Feb. 16, 1960 H. E. HOLLMANN 2,925,312
MAGNETIC AND ELECTRIC INK OSCILLOGRAPH
Filed Sept. 12, 1955 2 Sheets-Sheet 2
Fig. 3
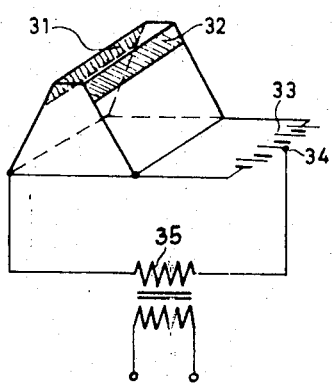
Fig. 4
Fig. 5
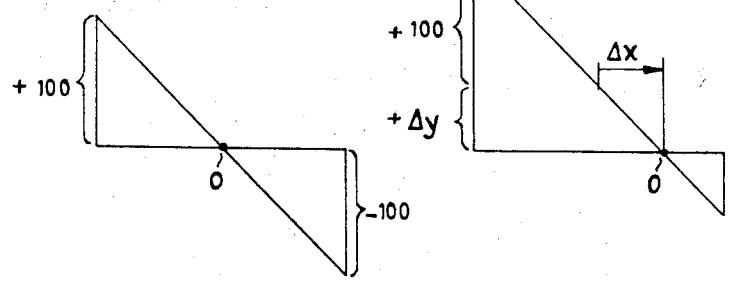
INVENTOR
HANS E. HOLLMANN
ATTORNEYS

2,925,312
MAGNETIC AND ELECTRIC INK OSCILLOGRAPH

Hans E. Hollmann, Studio City, Calif.

Application September 12, 1955, Serial No. 533,860

3 Claims. (Cl. 346—130)

The invention relates to a method and apparatus for recording electric signals directly upon a record surface such as a drum, a tape, a disk, etc., more specifically to an ink oscillograph.

The principal object of the invention is to provide an ink oscillograph without moving parts, more accurately with a minute amount of ink writing upon the record surface.

Another object of the invention is the use of magnetic and electric ink which, under the influence of magnetic or electric fields, thickens or solidifies.

Still another object is the spraying of magnetic or electric ink upon the record surface by means of an atomizer.

A further object is to provide a magnetic or electric ink oscillograph operating at high speed and whose recordings are immediately visible to the eye without the necessity of later development, washing, and drying as in the case of photographic recordings.

Still another object is an ink recorder which combines the advantages of an ink galvanometer or recording potentiometer with the high speed and frequency response of a light beam oscillograph or a cathode ray tube.

Other objects and advantages reside in the detail construction of the invention, which is designed for simplicity, economy, and efficiency. These will become more apparent from the following description.

In the detailed description of the invention reference is had to the accompanying drawings which form a part hereof. Like numerals refer to like parts in all views of the drawings and throughout the description.

Fig. 1 schematically illustrates the basic principle of the invention in the form of a simple electric ink oscillograph producing a density modulated trace.

Fig. 3 is a three-dimensional view of the recording system for an ink oscillograph producing a deflected trace in the form of standard oscillograms.

Figs. 4 and 5 illustrate the deflection of the recording spot of the system shown in Fig. 3.

The invention contemplates the use of magnetic and electric ink. In analogy to magnetic and electric fluids, such an ink is a suspension of fine iron powder, dielectric particles, or pigments, in an insulating carrier fluid, preferably in oil. When subjected to magnetic or electric fields, the suspended particles attract each other and form more or less strong chains or fibers so that the ink thickens and almost solidifies. In other words, the viscosity of magnetic and electric ink is a function of the applied magnetizing or polarizing fields. As far back as two decades, this controllable viscosity effect has been known for a peculiar type of electric ink, namely blood, in which the blood particles act as a finely dispersed dielectric while the serum is the insulating carrier fluid. Many years later numerous colloidal suspensions have been found to exhibit the viscosity effect such as suspensions of starch, limestone, or its derivatives, gypsum, flour, graphite magnesium, dioxide, and even coffee powder in light weight transformer oil, paraffine oil, olive oil, mineral oil, silicone oil, and the like. The philosophy of magnetic ink may easily be derived from the electric picture if the dielectric particles are replaced with ferromagnetic powder and if the electric control fields are replaced with magnetic fields. An efficient magnetic ink is a suspension of finely dispersed iron oxide or ferrite in silicone oil. The over-all efficiency of both types of ink can be improved by adding a suitable color to the carrier oil.

Figure 1:
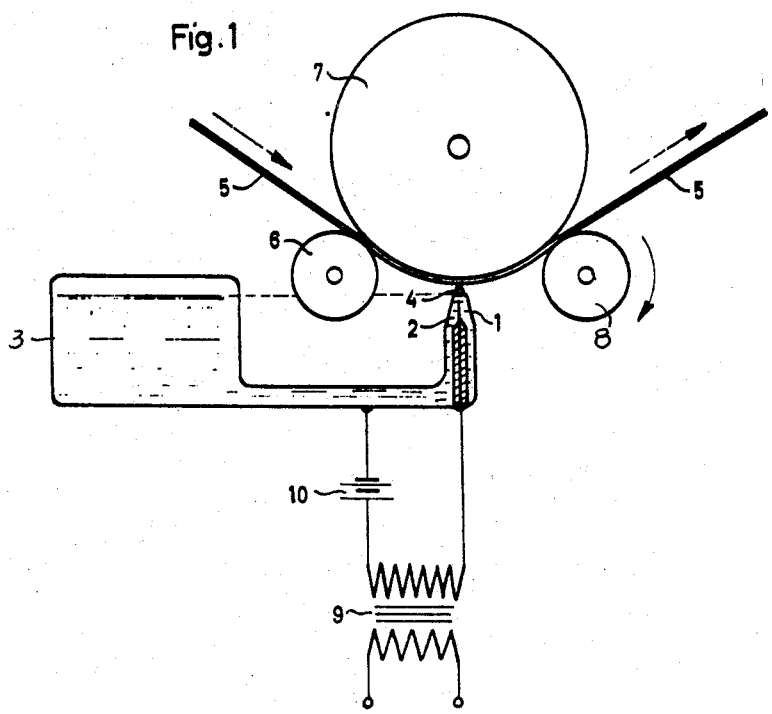

Referring now to Fig. 1, there is shown a metal nozzle 1 comprising a thin center electrode 2. The nozzle is filled with electric ink. The level in the ink reservoir 3 is kept at the same height as the nozzle's orifice. The electric ink then protrudes from the orifice in the form of a minute meniscus 4. The paper tape 5 is fed between the rollers 6, 7 and 8 being propelled by the driven roller 8 and kept taut by roller 6. Roller 7 is adjusted so as to bring the tape in slight contact with the upper crest of the ink meniscus. The motion of the tape causes a continuous trace. As soon as a voltage is impressed across the nozzle 1 and its center wire 2, the ink in the nozzle solidifies thus stopping the trace. The control is aided by electrostriction which causes the meniscus to retract. Because the degree of solidification and retraction is proportional to the applied voltage, the recorded line reflects the wave form of the input signal in the form of varying density. The bipolarity of the control effect requires that the input signal, delivered by the transformer 9, is superimposed upon a biasing voltage, delivered by the battery 10. The device is a simple and efficient ink oscillograph whose only moving part is the minute crest of the extremely small meniscus. Consequently, the upper frequency limit is much higher than that of any other ink recorder.

Figure 2:
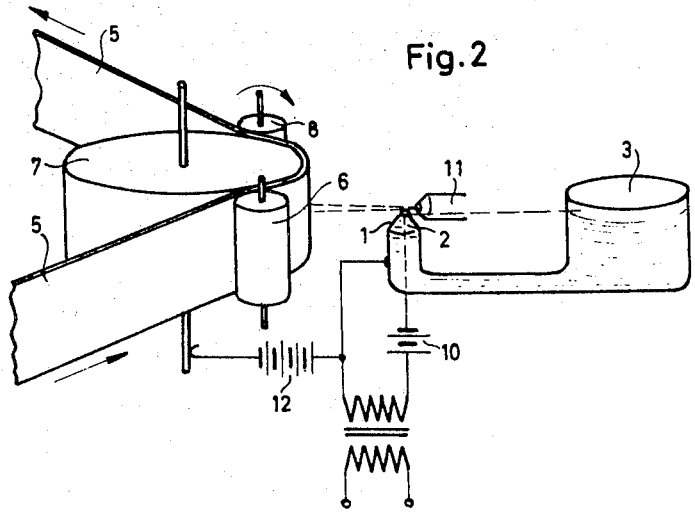
Fig. 2 represents a modification of the electric ink oscillograph comprising an atomizer.

Efficiency and frequency response are improved by means of the modification schematically illustrated in Fig. 2. It differs from the foregoing example in that there is no direct contact between the ink and the tape, more accurately between the meniscus and the tape. On the contrary, tape 5 and ink nozzle 1 are arranged perpendicularly and separated by a minute distance which, for clarity, is many times enlarged in the figure. In addition, there is an air nozzle 11 which, together with the ink nozzle, acts as an atomizer thus hurling a fine spray or jet of electric ink upon the tape 5. The amount of ink and therefore the density of the recording is controlled in the same way as before by means of a signal voltage impressed across the nozzle 1 and the center wire 2. The striction is sharpened and intensified by an electric acceleration of the particles in a strong field between the atomizer and the tape and produced, for example, by the high-voltage battery 12.

The two described examples exclusively provide a density modulated trace. The invention, however, provides additional means for deflecting the trace so that it deviates laterally from its center position. The input signal, therefore, is recorded in the form of standard oscillograms. Since an electrostatic deflection of the jet ejected from the atomizer in Fig. 2 is not efficient, the device illustrated in Fig. 3 has been developed. For clarity, only the recording system and its circuitry is shown whereas the reservoir and the tape are omitted. The new recording system is an elongated modification of the nozzle shown in Fig. 1. The new nozzle has the form of a wedge and the ink meniscus contacts the tape across its full width. In addition, the nozzle is made of an insulating material, e.g. ceramic but contains two electrodes 31 and 32 near its orifice. Electrode 31 is a metal strip but electrode 32 is semi-conductive. The battery 33 produces a constant voltage drop of e.g. 200 volts along the electrode 32. If the center tap 34 of the battery 33 is grounded or connected with electrode 31, the electric field along the nozzle has the form diagrammed in Fig. 4. Both ends of the nozzle carry the maximum field strength of +100 volts divided by the nozzle gap. In the center the field strength passes zero which allows only the electric ink in the vicinity of the zero point to remain fluid while both sides solidify under the influence of the positive and negative fields. Consequently, the nozzle acts similar to the concentric nozzle shown in Fig. 1 and traces a sharp line upon the tape.

If a signal voltage, delivered by the input transformer 35, is impressed between electrode 31 and center point 34 of the battery 33, for instance +50 volts, the electric field along the nozzle deforms as shown in Fig. 5. The zero point shifts toward the negative end of the semiconductor 32 thus being deflected. It can easily be seen that the deflection of the active recording spot is proportional not only to the signal amplitude but also to the polarity, while the battery 33 acts as a bipolar bias. In this way, the original density modulation is changed into a Y-deflection and the resulting trace reflects the input signal accurately similar to a conventional oscillograph.

Without further comments, the elongated nozzle can be supplemented with a wedge-shaped air nozzle so as to form a flat atomizer. In other words, the ink oscillograph shown in Fig. 3 can be modified according to Fig. 2.

In a similar manner, the ink oscillograph can be operated with magnetic ink in the form of fine iron dust or iron oxide suspended in oil. In this case, the previously described electric fields must be replaced with magnetic fields. In other words, the electrodes of the previous nozzles are to be replaced with equivalent coils or windings which surround the nozzles. It is thus understood that the term "field" unless otherwise qualified in the claims hereto denotes either an electrical field or a magnetic field.

There are various additional modifications and applications, e.g. facsimile message recordings in the form of teletype and picture transmission.

I claim:

1. In a fluid writing oscillograph, the combination comprising a fluid nozzle, fluid in said nozzle containing material which thickens in accordance with the intensity of a field applied thereto, said oscillograph having a recording medium on which recordings are made, means for producing a varying field which varies in accordance with the information recorded by said oscillograph, means subjecting the fluid in said nozzle to said varying field to control the flow of fluid from said nozzle onto said medium, said nozzle having a width substantially equal to the width of said medium, and means modifying said field along the width of said nozzle such that the field has zero intensity at one point along the width.

2. Recording apparatus comprising an elongated fluid nozzle having an exit port defined by a pair of generally parallel extending metallic elements, one of said elements being highly resistive so that a current flow therethrough produces substantial voltage drop therealong, a source of continuous voltage having opposite terminals thereof connected to said one element, said source being center-tapped, with the center tap thereof connected to the other of said metallic elements, and a source of variable voltage connected between said center tap and said other element.

3. Recording apparatus comprising a fluid duct having an exit port defined by a pair of electrodes, one of said electrodes being highly resistive, means for producing a current flow through said highly resistive electrode, said last-mentioned means comprising a source of voltage, said source having a tap thereof connected to the other electrode, and a source of variable voltage connected between said electrodes.

References Cited in the file of this patent
UNITED STATES PATENTS

| | | |
|---|---|---|
| 1,940,274 | Severy | Dec. 19, 1933 |
| 1,958,406 | Darrah | May 15, 1934 |
| 2,143,376 | Hansell | Jan. 10, 1939 |
| 2,151,638 | Genschmer | Mar. 21, 1939 |
| 2,302,289 | Cook | Nov. 17, 1942 |
| 2,616,984 | Pare | Nov. 4, 1952 |
| 2,670,749 | Germer | Mar. 2, 1954 |
| 2,676,868 | Jacob | Apr. 27, 1954 |
| 2,763,204 | Sims | Sept. 18, 1956 |
| 2,776,182 | Gunderson | Jan. 1, 1957 |

FOREIGN PATENTS

| | | |
|---|---|---|
| 703,916 | France | May 8, 1931 |